(12) United States Patent
Korhonen

(10) Patent No.: US 10,373,390 B2
(45) Date of Patent: Aug. 6, 2019

(54) AUGMENTED REALITY BASED SOCIAL PLATFORM

(71) Applicant: METATELLUS OÜ, Tallinn (EE)

(72) Inventor: Juha Olavi Korhonen, Tallinn (EE)

( * ) Notice: Subject to any disclaimer, the term of this patent is extended or adjusted under 35 U.S.C. 154(b) by 0 days.

(21) Appl. No.: 15/815,952

(22) Filed: Nov. 17, 2017

(65) Prior Publication Data

US 2019/0156575 A1 May 23, 2019

(51) Int. Cl.
| | |
|---|---|
| G06Q 50/00 | (2012.01) |
| G06T 19/00 | (2011.01) |
| G06T 19/20 | (2011.01) |
| H04N 13/332 | (2018.01) |

(52) U.S. Cl.
CPC .......... G06T 19/006 (2013.01); G06Q 50/01 (2013.01); G06T 19/20 (2013.01); H04N 13/332 (2018.05)

(58) Field of Classification Search
CPC .............................. G06T 19/006; G06Q 50/01
See application file for complete search history.

(56) References Cited

U.S. PATENT DOCUMENTS

| | | | | |
|---|---|---|---|---|
| 2008/0222295 | A1* | 9/2008 | Robinson | G06F 17/30867 709/227 |
| 2011/0285703 | A1* | 11/2011 | Jin | G06Q 50/01 345/419 |
| 2012/0110473 | A1* | 5/2012 | Tseng | G06Q 50/01 715/753 |
| 2013/0249947 | A1* | 9/2013 | Reitan | G06F 3/011 345/633 |
| 2014/0114845 | A1* | 4/2014 | Rogers | G06T 15/08 705/39 |
| 2014/0204119 | A1* | 7/2014 | Malamud | G06T 19/006 345/633 |
| 2014/0228118 | A1* | 8/2014 | Hardy | G06T 19/006 463/31 |
| 2016/0093108 | A1* | 3/2016 | Mao | A63F 13/42 345/633 |
| 2016/0379409 | A1* | 12/2016 | Gavriliuc | G06T 19/006 345/8 |
| 2017/0038829 | A1* | 2/2017 | Lanier | H04L 65/403 |
| 2018/0095616 | A1* | 4/2018 | Valdivia | H04L 51/16 |

* cited by examiner

*Primary Examiner* — Jeffery A Brier
(74) *Attorney, Agent, or Firm* — Jacob Eisenberg

(57) ABSTRACT

An example of an augmented reality based social platform can include the computer implemented modules of: an avatar creation module for creating user based avatars which can be manipulated within the social platform, a map generation module for creating an augmented map of a real-world location, said map generation module capable of integrating platform user interactable objects with corresponding real-world objects, an auxiliary application integration module capable of integrating a non-platform based application with its platform based counterparts, and a commercial conversion module capable of spatially reserving area, surfaces, pathways, interactable objects or a combination thereof within the augmented map for exclusive usage rights of one, or a collection of, avatar(s). A platform can also include a user data integration module capable of integrating non platform based user information with its platform based counterpart.

20 Claims, 3 Drawing Sheets

AUGMENTED REALITY BASED SOCIAL PLATFORM

FIELD OF INVENTION

The present invention relates to the field of augmented reality based social platforms.

BACKGROUND OF INVENTION

Current virtual reality solutions tend to exist in a vacuum; they are lone-standing applications and have little to no integration with other existing technologies.

Many of the existing VR software is focused on fulfilling one task only and have been developed for one specific purpose—be it for practical (e.g. VR applications for medical/military training) or entertainment purposes (e.g. VR gaming). Often the existing software presents complete visual spaces that either only depict a limited area—such as one room—or spaces that are not intended to reflect reality, for example dream-like spaces within VR gaming. The possibility for movement is limited to a few gestures only and it is impossible to move outside and further out from the intended location of the action.

VR solutions that do not intend to depict real-life activities, such as in VR gaming, already exist. Software of this kind plays on novelty value to the user—the world they get to explore is dream-like, even magical, and catches attention quickly. The user who interacts with such software may be inspired by the novelty of what he or she is experiencing as the visuals and the possible actions are not realistic, they are non reproducible in real life. The novelty of the experience quickly wears out once the user has explored all that the designed world has to offer.

The visuals in existing VR software can be captivating however they often lack usability and practicality, or are intended to be practical in one way only.

Most importantly however, the existing VR software does not possess a social aspect as the user is always "alone" in the virtual world, or faced with non-human characters.

SUMMARY OF THE INVENTION

An example of an augmented reality based social platform can include the computer implemented modules of: an avatar creation module for creating user based avatars which can be manipulated within the social platform, a map generation module for creating an augmented map of a real-world location, said map generation module capable of integrating platform user interactable objects with corresponding real-world objects, an auxiliary application integration module capable of integrating a non-platform based application with its platform based counterparts, and a commercial conversion module capable of spatially reserving area, surfaces, pathways, interactable objects or a combination thereof within the augmented map for exclusive usage rights of one, or a collection of, avatar(s). A platform can also include a user data integration module capable of integrating non platform based user information with its platform based counterpart.

Aspects of the present invention rely heavily on integration as they do not aim to develop completely by its own. For example, when it comes to user-to-user messaging, a users already existing messaging applications can be integrated rather than developing its own in-game messaging platform. A benefit here is the seamlessness of integration with platforms and technologies that are already familiar to users, so as to increase user adoption from an early stage. Moreover, by making it easy to integrate rather than create new solutions within an application, the possibilities for new functions and features within it are virtually limitless.

It is another aspect of certain embodiments that an application allows for essentially expanding an intended area of action allowing its users to move freely, creating an impression of an unlimited space.

It is another aspect of certain embodiments that an application allows for the virtual landscape to be ever-changing and can be constantly recreated and co-created by all the users around the world, leaving users wanting to explore ever further.

It is another aspect of certain embodiments that an application allows for users to build a virtual world which is highly interactive and with endless possibilities of exploring—every door within an environment can be opened, buildings can be entered, and so on.

It is another aspect of certain embodiments that an application allows for the user to have the possibility to interact with other users of the software on different levels, essentially creating a worldwide social network.

Avatar interaction is one aspect that makes embodiments of the present invention stand out from other existing VR solutions. It is another aspect of certain embodiments that an application allows for all users to be free to create their avatars and interact with each other freely.

While multiple mapping solutions already exist in 2D and 3D, the prior invention goes beyond any other existing invention. In addition to mapping the physical world in virtual reality, embodiments of the present invention bring in layers upon layers of integration with other technologies, creating a unique world in which almost any real-life interaction is possible.

DETAILED DESCRIPTION OF EXEMPLARY EMBODIMENTS

Figure 1:
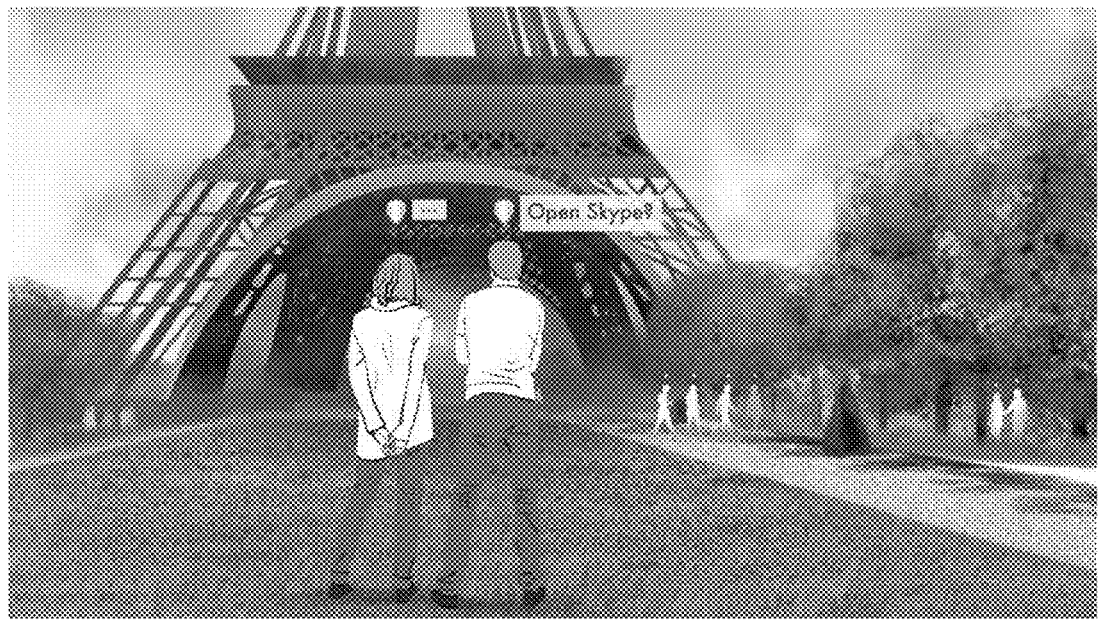
FIG. 1 shows an example screen shot of a social platform.
Figure 2:
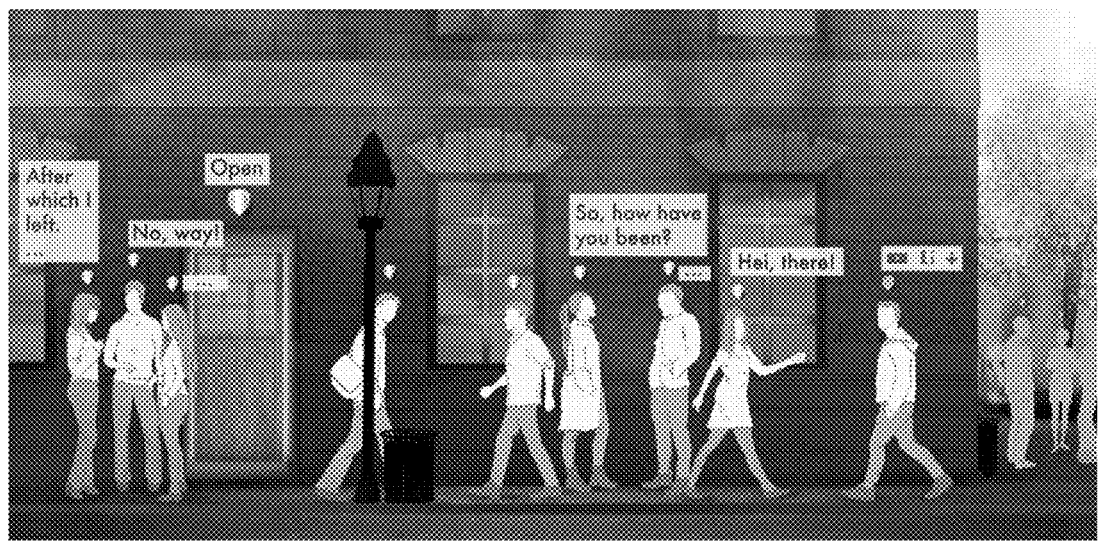
FIG. 2 shows an example environment from a social platform.
Figure 3:
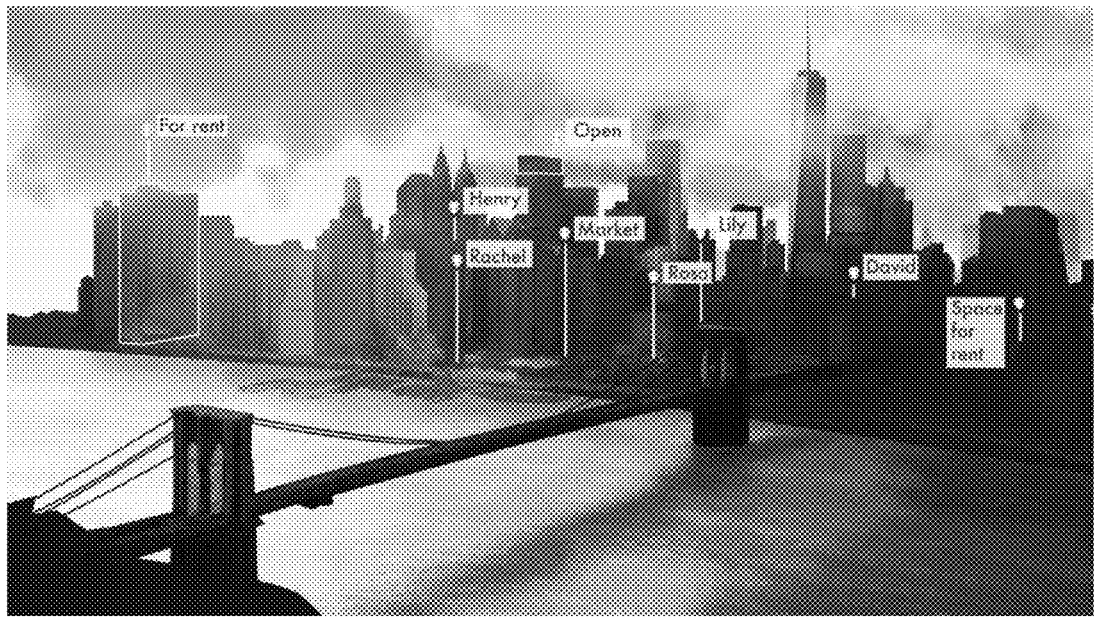
FIG. 3 shows an example birds eye view from a social platform.
Figure 4:
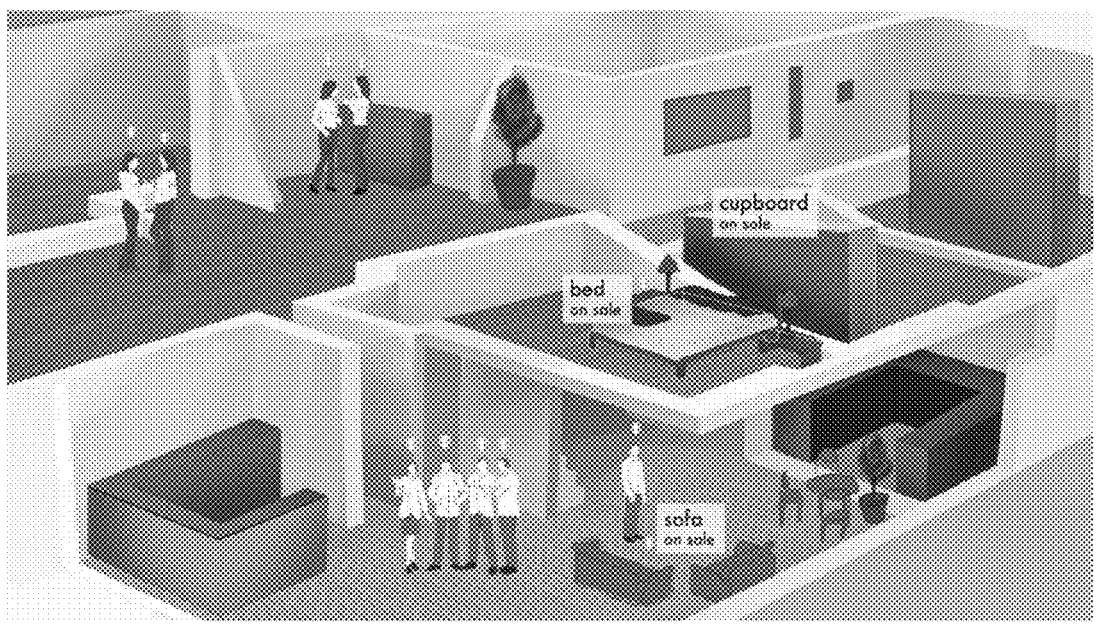
FIG. 4 shows an example room view from a social platform.

FIGS. 1 and 2 show example screen shots and environments of a social platform where virtual user avatars are able to move and interact with both each other and objects within a real world based map environment. FIG. 3 shows a birds eye view of from an example social platform. FIG. 4 shows an example view within a room and/or commercial space within a platform, as will be discussed in more detail below.

Figure 5:
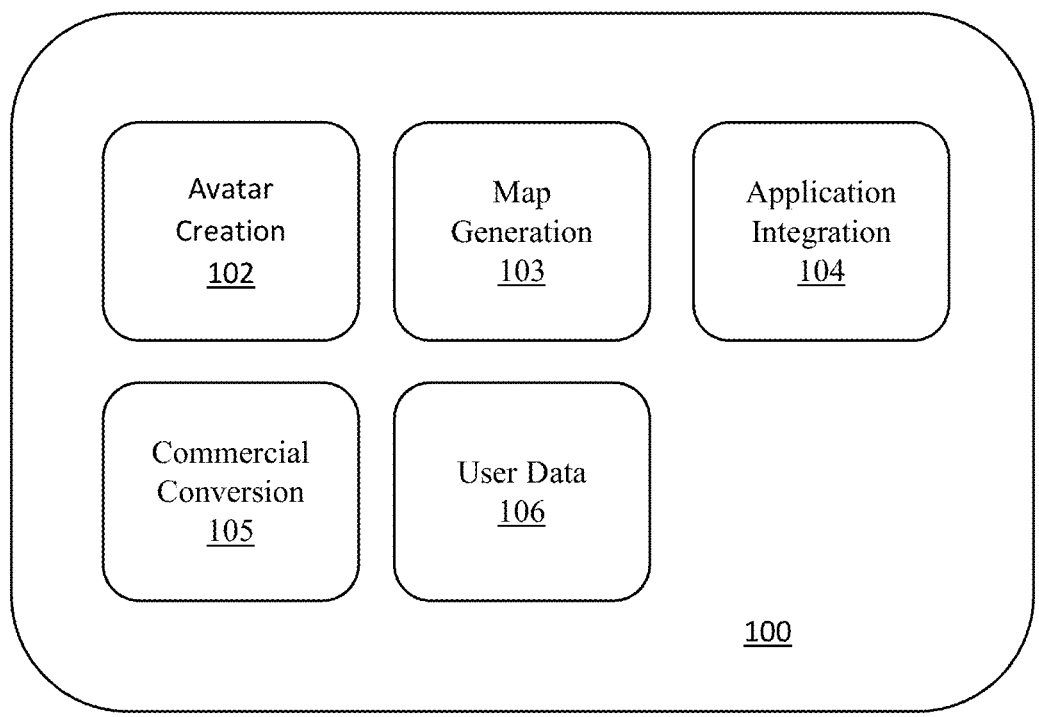
FIG. 5 shows an example of an augmented reality based social platform 100.

FIG. 5 shows an example of an augmented reality based social platform 100 can include the computer implemented modules of: an avatar creation module 102 for creating user based avatars which can be manipulated within the social platform, a map generation module 103 for creating an augmented map of a real-world location, said map generation module capable of integrating platform user interactable objects with corresponding real-world objects, an auxiliary application integration module 104 capable of integrating a non-platform based application with its platform based counterparts, and a commercial conversion module 105 capable of spatially reserving area, surfaces, pathways, interactable objects or a combination thereof within the augmented map for exclusive usage rights of one, or a collection of, avatar(s). A platform can also include a user data integration module 106 capable of integrating non platform based user information with its platform based counterpart.

Map generation modules can include a rough map of the earth, and wherein interactable objects make up a subset of real world objects. The interactable objects can be selected from: doors, doorways, windows, buildings, vehicles, machines and other inanimate objections.

Non-platform based applications can include non-platform based messaging and/or telecommunications applications, gaming applications and hardware specific software applications.

At least some of the specially reserved interactive objects of the commercial module can correspond to the interactive objects of the real world map. At least one of the corresponding interactive objects can be a gateway to a commercial space within the platform but with no real world equivalent. Avatars can be capable of traversing between the real-world based map and the commercial space seamlessly. For example, a user of the platform, while operating an avatar, can be capable of seeing aspects of both the real world map and the commercial space simultaneously.

According to certain examples, every user of the platform can be presented the same information within the real world map. Additionally, each user of the platform can be presented information from the commercial module based on their unique user data.

Furthermore, information displayed from the commercial module to one user avatar can be displayed to a plurality of other, un related avatars in the same geospatial area within the real-world based map.

Information from the real-world based map, commercial module and information of a plurality of avatars can be displayable on a users virtual reality headset. That user can be represented as an avatar within the platform.

According to certain examples, all of the avatars can move freely within the map and commercial spaces.

One example platform is as follows: A basic version of the platform can exist on a desktop and as a smartphone application. Users are able to navigate the platform from a first-person view using a mouse/touchpad and/or keyboard control. Basic functionalities exist, interaction takes place via text bubbles rather than voice Another example platform is that the software is usable with a VR headset. Communication between avatars takes place via speech, mimicking real impressions.

Different versions of the platform can co-exist—each user can choose to participate with the hardware they have access to. However, the platforms full functionality can be unlocked when wearing a VR headset.

Avatar Creation

Upon registering to a platform, users are asked to compile an avatar for themselves. Platform software can come to help—it can map the person's face using facial recognition software and creates a unique avatar for each user. The avatar is customizable to an extent (style, clothing), but typically reflects the real human behind the avatar.

Avatar movement within the platform: Users on mobile phone can navigate the platform by swiping their finger on the screen; users on computers can use a mouse or keyboard controls. Users can choose to use a first-person view to navigate the platform, or alternatively a top view. Users can move around on foot, on bicycle, by car, or even flying. To introduce an aspect platform-native gaming, brand integrations are also possible. For example, if a user "likes" a brand promoted on the platform, he/she unlocks a certain means of transportation. F. ex. liking a certain brand of energy drink would give wings to the user for a short period of time.

Navigating the platform can use a mere click. The user can hop from New York to Shanghai in a matter of moments and is free to continue exploring another part of the world instantly. This is done by either choosing a destination on a map or using a search engine to type in the address of the destination.

It is possible that a level of gamification is necessary to keep users returning to and engaged with the platform over a long period of time. There are a multitude of ways to ensure this, one of which is to develop an in-game reward system.

To unlock features of the platform, users are rewarded on the following basis: Active time spent in the platform, good behavior in-game, Consistently reporting bad behavior by other users, and Actively tagging locations with UGC photos/videos.

Features to be unlocked with rewards could include: Community management—moderating UGC submissions and Unlocking layers of customization.

Users do not need to use the platform for a certain purpose, much like one would use a regular mobile application. Users are welcome to roam freely around the platform with no purpose other than discovery, as social interactions can happen within the platform with just as much ease as in real life. Essentially, the platform is not a game where you complete missions.

Certain examples of the platform aim to be an open and welcoming where people can make new connections and, always feel safe. To ensure a safe and trusting community, a platform can welcome cooperation with legislative bodies.

Any business wanting to start operating at scale in a platform will need to employ staff dedicated to developing, building as well as maintaining the business' presence inside the software. This can results in new jobs for: Developers, Admins, and Technical maintenance.

Furthermore, businesses will need to staff their retail spaces inside the platform to be able to serve customers and answer their questions. This means a whole new cluster of retail jobs can be created within the platform. Possible new employment opportunities include: Shopkeepers, Travel agents, and Real estate agents.

Due to the virtual nature of the platform, those roles are location-agnostic, meaning anyone with an Internet connection and the necessary skills, software & hardware can perform these jobs.

The present platform can be embodied in a plurality of different applications. From a social point of view, a platform can revolutionize online interaction as it imitates real-life scenarios and diminishes the feeling of being a screen apart from one another. Furthermore, a platform can not only create a brand new digital global marketplace for goods and services that already exist today, it can also provide social & developmental opportunities for its users to pursue different interests/hobbies and make new connections.

User-to-User Communication

Social in its nature, embodiments bring the best of communication technologies together. Users can explore the world in a fashion that imitates a real-world experience— they are able to walk down already familiar streets or admire the sights of a new city while interacting with other users doing the same.

To communicate with other users, users can either publicly (appears to everyone) or privately (one recipient only) type messages to appear in chat bubbles. Alternatively, users can chat using VoiP technologies. By incorporating already familiar communication technologies into a virtual reality environment that very closely imitates a street-like experience, an application can aim to bring back an element of real human interaction into online communication. In an application, communication, while still in virtual realm, feels "real" as it imitates real-world behavioral patterns and the users feel less confined by the screen in front of them.

Users can integrate existing social network profiles to their avatars, giving users a variety of possibilities to interact: Simple U2U messaging, Business networking, Hobby networking, Online dating, and Photo/video sharing. Each user can decide which social network profiles they want to integrate into the platform, enabling them to customize their experience depending on their current needs/wishes.

Casual Sharing & "Mapping"

Additionally, users can map the world by sharing media content they have themselves produced, essentially using the platform as a content repository. This can be done by users uploading photos/videos of a specific place in the world and tagging the exact location where the media was captured. In the platform, the photo/video will appear as a clickable dot in the exact location where the media was produced, and expands into the photo/video upon clicking. Each media uploaded to the application can be given a unique identifier and a shareable link, making it easy for users to share their content off the platform.

In an example platform there can be large parts of the Earth which will not be 3D mapped (remote areas, countries with less infrastructure)—allowing users to map it with their own content will help cover as much of the world as possible.

The following briefly explains how user interaction inside the platform can be regulated. Upon signing up to the platform each user can customize their experience by choosing their security settings. Non-customized settings will enable the user to see all other users with similar settings and interact freely with them. However, the user can choose to interact and be approached by only a certain group of users: by gender, age group, etc. It is up to the user how they want to customize their experience.

Commercial Spaces

In real cities, a lot of buildings are occupied by commercial operations such as supermarkets, shops, banks and more. In the platform this can be no different. Real world commercial operations such as supermarkets/department stores/retailers as well as smaller vendors are able to rent commercial spaces in the platform for a fraction of the price it would cost in reality. The reason behind lowering the prices can be to democratize opportunities and allow for smaller vendors/operations to compete with larger ones. Once a rental agreement between a platform operator and the user/operation has been made then users can walk down streets and open doors to business. The possibility to open doors and set foot inside buildings is, in fact, one feature which can set the present platforms apart from other VR solutions, as possibilities to enter different spaces are essentially limitless as long as users/operations are creating them.

For example, when a user opens a door and steps into a shop, they can see a virtual space designed and/or developed by the owner of the space—be it a commercial retailer or a small vendor. It is up to the renter of the space to either develop their own little VR reality within the platform, or use a platform pre-designed room design. Commercial spaces are rented out by platform for an agreed period of time and allow business owners to run their operations freely. In addition to traditional high-street retailers, the platform can allow online-only businesses to have virtual shopfronts, for example online shopping operations will be able to purchase showroom space to showcase their products.

However, renting commercial space is not limited to retailers in the platform. Anyone can reserve space within the platform, potentially for a nominal fee which they are then free to use as they please. The space can be used in a multitude of ways. For example an independent crafts enthusiast who does not have the funds to open up shop in a physical location can design a small online crafts boutique, immediately visible to any passer by.

Other examples of possible commercial spaces include (but are not limited to):

Grocery stores (location-based only): Users browse through grocery store aisles to choose their favorite local products, delivered straight to their door by their local supermarket Bookstores: Users can enter virtual bookstores and browse previews of books, to then order them either as ebooks or real books off existing book retailers.

Music stores: Users can enter virtual music stores (powered by existing OR new/independent retailers) to browse new music, recommendations tailored to the specific user Travel agents: Users can visit virtual travel agents who are able to sell travel deals and packages by virtually transporting the customer to the destination. Travel agents are able to give customers 360 tours of their preferred destination, hotel room previews etc. The customers can then book real-life holidays thanks to the previews Real estate agents: Real estate agents are able to demonstrate real-life property by giving customers 360 tours of their property of interest. Essentially, the platform can "double" the amount of property and real estate currently available Construction companies: Construction companies are able to design and demonstrate building concepts within the platform to evaluate the viability of said projects in real life Advertisement By essentially creating a duplication of the existing world, the platform can also create new advertising space. Virtual billboards and shop windows are available for advertisers to buy advertising space in. Even more interestingly, advertisers can reap the benefits of super-targeting customers: a user accounts can be linked to their existing profiles with tech giants, meaning there is existing user data to base advertising campaigns on. For example a user who has been browsing websites for a new car can see said cars drive past in the platform, ads can also be linked to them.

Micropayments can be a standard method of transactions within the platform. Users are free to link their platform account to an existing secure payment system to be able to make purchases.

Peer-to-Peer Business

As the platform creates a new sphere of services and goods, such as design and conceptualization of virtual spaces or random collectible items, a market is created for exchanging goods and services within the platform, creating earning potential for its users.

Educational Applications

Democratizing education is a huge opportunity within the platform. Users can choose to take part in organized learning offered by different existing institutions as well as engage in peer-to-peer learning. Many online education opportunities already exist today, and online learning portals are also widely used by universities and other educational institutes. However, a VR experience does not only make classrooms bigger and help students in remote locations access education, it also helps make the learning more hands-on and practical.

Online courses: A multitude of online course providers already exist today—those courses can be integrated into the platform as virtual classrooms. Virtual classrooms can be created for about anything—from programming and language learning to driving schools.

Universities: Although the platform does not necessarily aim to replace the real world university experience, using the platform is an exceptional opportunity for universities around the world. For example, they can showcase their curricula via open days—including (but not limited to) campus tours and lesson previews. Remote VR classrooms could also be available for students who have been accepted into university programs but are unable to attend due to distance.

Moreover, educational institutes other than universities can also benefit from the platform, for example:

Libraries: Libraries around the world can grant access to users to browse through their digitized collections, essentially opening their doors to a worldwide audience.

Museums: Museums around the globe can exhibit their digital collections within the platform. Users can enter virtual galleries of thousands of artworks and appreciate art without having to leave the comfort of their homes.

Recreational Applications

In addition to virtual learning and educational pursuits, it is also possible to use the platform to engage in leisurely activities and practice hobbies.

Gaming Integrations

The platform is the perfect home to many integrated gaming solutions. For example, within the platform playing chess with a friend no longer means having to leave the house or invite guests—existing online gaming partners make sure that there are spaces within the platform for that kind of activities. Furthermore, online casinos are no longer just 2D slot machines and blackjack tables on a computer screen—users can enter virtual casinos straight from the street and experience a real casino environment without leaving the comfort of their home.

Hobby integrations: In addition to online games, the platform also provides an opportunity for users to pursue new hobbies or work on their current passions. Sports like tennis or bowling, hobbies like cooking—all of those can be pursued alone or in groups. For example, football teams can practice tactics together in their home field within the platform.

New technologies such as hologram technology can open up even further avenues for the platform and its multiple applications.

Furthermore, there can be a non-transitory computer readable medium having stored thereon a set of computer readable instructions for causing a processor of a computing device to carry out the methods and steps described above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An augmented reality based social platform comprising the computer implemented modules of:
   an avatar creation module for creating user based avatars which can be manipulated within the social platform,
   a map generation module for creating an augmented map of a real-world location, said map generation module capable of integrating platform user interactable objects with corresponding real-world objects,
   an auxiliary application integration module capable of integrating a non-platform based application with its platform based counterparts, and
   a commercial conversion module capable of spatially reserving area, surfaces, pathways, interactable objects or a combination thereof within the augmented map for exclusive usage rights of one, or a collection of, avatar(s).

2. The augmented reality based social platform of claim 1, further comprising a user data integration module capable of integrating non platform based user information with its platform based counterpart.

3. The augmented reality based social platform of claim 1, wherein the map generation module includes a rough map of the earth, and wherein interactable objects make up a subset of real world objects.

4. The augmented reality based social platform of claim 3, wherein the interactable objects are selected from: doors, doorways, windows, buildings, vehicles, machines and other inanimate objections.

5. The augmented reality based social platform of claim 1, wherein non-platform based applications include non-platform based messaging and/or telecommunications applications, gaming applications and hardware specific software applications.

6. The augmented reality based social platform of claim 1, wherein at least some of the specially reserved interactive objects of the commercial module correspond to the interactive objects of the real world map.

7. The augmented reality based social platform of claim 6, wherein at least one of the corresponding interactive objects is a gateway to a commercial space within the platform but with no real world equivalent.

8. The augmented reality based social platform of claim 7, wherein avatars are capable of traversing between the real-world based map and the commercial space seamlessly.

9. The augmented reality based social platform of claim 8, wherein a user of the platform, while operating an avatar, is capable of seeing aspects of both the real world map and the commercial space simultaneously.

10. The augmented reality based social platform of claim 1, wherein every user of the platform is presented the same information within the real world map.

11. The augmented reality based social platform of claim 2, wherein each user of the platform is presented information from the commercial module based on their unique user data.

12. The augmented reality based social platform of claim 1, wherein information displayed from the commercial module to one user avatar is displayed to a plurality of other, unrelated avatars in the same geospatial area within the real-world based map.

13. The augmented reality based social platform of claim 1, wherein information from the real-world based map, commercial module and information of a plurality of avatars are displayable on a users virtual reality headset.

14. A non-transitory computer readable medium having stored thereon a set of computer implementable instructions for generating an augmented reality based social platform comprising
- an avatar creation module for creating user based avatars which can be manipulated within the social platform,
- a map generation module for creating an augmented map of a real-world location, said map generation module capable of integrating platform user interactable objects with corresponding real-world objects,
- an auxiliary application integration module capable of integrating a non-platform based application with its platform based counterparts, and
- a commercial conversion module capable of spatially reserving area, surfaces, pathways, interactable objects or a combination thereof within the augmented map for exclusive usage rights of one, or a collection of, avatar(s).

15. The augmented reality based social platform of claim 14, further comprising a user data integration module capable of integrating non-platform based user information with its platform based counterpart.

16. The augmented reality based social platform of claim 14, wherein the map generation module includes a rough map of the earth, and wherein interactable objects make up a subset of real world objects.

17. The augmented reality based social platform of claim 14, wherein at least some of the specially reserved interactive objects of the commercial module correspond to the interactive objects of the real world map.

18. The augmented reality based social platform of claim 17, wherein at least one of the corresponding interactive objects is a gateway to a commercial space within the platform but with no real world equivalent.

19. The augmented reality based social platform of claim 15, wherein each user of the platform is presented information from the commercial module based on their unique user data.

20. The augmented reality based social platform of claim 19, wherein information displayed from the commercial module to one user avatar is displayed to a plurality of other, unrelated avatars in the same geospatial area within the real-world based map.

* * * * *